US008437364B2

(12) United States Patent
Lioy et al.

(10) Patent No.: US 8,437,364 B2
(45) Date of Patent: May 7, 2013

(54) WIRELESS NETWORK SUPPORTING FAILOVER BETWEEN NETWORK PROTOCOLS

(75) Inventors: Marcello Lioy, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 11/100,916

(22) Filed: Apr. 6, 2005

(65) Prior Publication Data
US 2006/0028998 A1 Feb. 9, 2006

Related U.S. Application Data

(60) Provisional application No. 60/599,488, filed on Aug. 6, 2004.

(51) Int. Cl.
*H04J 3/16* (2006.01)
*H04L 12/28* (2006.01)
*G06F 15/16* (2006.01)

(52) U.S. Cl.
USPC ............................ 370/463; 370/419; 709/250

(58) Field of Classification Search .................... 370/338
See application file for complete search history.

(56) References Cited

U.S. PATENT DOCUMENTS

| 6,738,981 | B1 * | 5/2004 | Tonnby et al. ................... 725/98 |
| 7,006,478 | B1 * | 2/2006 | Mizell et al. .................... 370/338 |
| 7,065,367 | B2 * | 6/2006 | Michaelis et al. .......... 455/452.2 |
| 7,126,939 | B2 * | 10/2006 | Barany et al. ................. 370/352 |
| 7,136,364 | B2 * | 11/2006 | Saint-Hilaire et al. ......... 370/331 |
| 7,177,646 | B2 * | 2/2007 | O'Neill et al. ................ 455/450 |
| 7,599,323 | B2 * | 10/2009 | Chandranmenon et al. .. 370/328 |
| 2004/0004940 | A1 | 1/2004 | Abrol et al. .................... 370/252 |
| 2004/0009751 | A1 | 1/2004 | Michaelis et al. ............. 455/62 |
| 2004/0184465 | A1 * | 9/2004 | Lee et al. ...................... 370/400 |

(Continued)

FOREIGN PATENT DOCUMENTS

| EP | 1538803 | 6/2005 |
| WO | 0048373 | 8/2000 |

OTHER PUBLICATIONS

A Model of IPv6/IPv4 Dual Stack Internet Access Service by Y. Shirasaki published on Feb. 2004.*
Analysis on IPv6 Transition in 3GPP Networks, Published in 2003.*

(Continued)

*Primary Examiner* — Faruk Hamza
*Assistant Examiner* — Cassandra Decker
(74) *Attorney, Agent, or Firm* — Kristine U Ekwueme

(57) ABSTRACT

The disclosure is directed to techniques for supporting failover between different network protocol addressing families in a wireless communication network. The techniques may be implemented in a mobile wireless communication device. A logical interface selects a physical interface for access to the network in response to a request from an application module. The network access request issued by the application module need not specify a network protocol type. Instead, upon selection of the physical interface, the logical interface notifies the application of the network protocol type associated with the physical interface. The logical interface may select a physical interface corresponding to a particular network protocol when available, based on connection preferences specified by the application module or a global setting within the device. If a physical interface corresponding to the network protocol is not available, however, the logical interface selects a physical interface corresponding to a different network protocol.

25 Claims, 8 Drawing Sheets

U.S. PATENT DOCUMENTS

2004/0264474 A1* 12/2004 Sbida .................... 370/395.5
2005/0008032 A1* 1/2005 Yamamoto et al. .......... 370/466
2005/0182829 A1* 8/2005 King et al. ................ 709/220

OTHER PUBLICATIONS

RFC 3574—Transition Scenario for 3GPP Networks, Aug. 2003.*
International Search Report, PCT/US05/027639, International Search Authority, European Patent Office, Dec. 27, 2005.
Written Opinion, PCT/US05/027639, International Search Authority, European Patent Office, Dec. 27, 2005.
International Preliminary Report on Patentability, PCT/US05/027639, International Preliminary Examining Authority, United States, Sep. 19, 2006.
Taiwan Search Report—TW094126855—TIPO—Oct. 5, 2011.

* cited by examiner

WIRELESS NETWORK SUPPORTING FAILOVER BETWEEN NETWORK PROTOCOLS

This application claims the benefit of U.S. Provisional Application No. 60/599,488, filed Aug. 6, 2004, the entire content of which is incorporated herein by reference.

TECHNICAL FIELD

The disclosure relates to wireless communication and, more particularly, use of different network communication protocols within a wireless communication network.

BACKGROUND

In a communication network, network nodes exchange data using network communication protocols. Internet Protocol (IP) is an example of a network communication protocol that facilitates packetized data communication between network nodes. In an IP-based network, each network node has an IP address. A packet sent between two network nodes generally includes a header with a source IP address and a destination IP address. The source address identifies the node that sends the packet, and the destination address identifies the intended recipient of the packet.

Legacy communication networks generally use 32-bit IP addresses according to IP Version 4 (IPv4). Wireless communication networks conforming to the TIA IS-835 standard, for example, rely on the IPv4 address space to identify wireless nodes ranging from network equipment to wireless communication devices (WCDs), such as mobile telephones. Dense mobile networks with millions of individually addressable nodes have resulted in rapid depletion of the 32-bit address space provided by IPv4.

With the limitations imposed by the IPv4 address space, network carriers are beginning to implement the 128-bit address space provided by IP Version 6 (IPv6). The vastly expanded address space of IPv6 permits wireless operators to easily support "always-on" services, in which case network nodes retain persistent IP address assignments. Some WCDs now support both IPv4 and IPv6 addressing for different applications. The use of IPv6 addresses is generally desirable for applications requiring long-lived connections.

Although IPv6 addressing is generally desirable, network equipment in many coverage areas will not immediately provide support for IPv6 during the transition from IPv4 to IPv6. Accordingly, the availability of network interfaces supporting IPv6 may vary as a WCD travels among different coverage areas.

SUMMARY

This disclosure is directed to techniques for supporting failover between different network protocols in a wireless communication network. The techniques may be implemented in a WCD having an application module that supports communication according to two or more different protocols, such as IPv4 and IPv6. A logical interface implemented by the WCD selects a physical interface for access to the wireless communication network in response to a network access request from the application module.

The network access request issued by the application module does not specify a particular network protocol because it is uncertain whether a physical interface corresponding to a particular network protocol will be available at the time of the request. Instead, the application module binds to the logical interface, which then attempts to negotiate network access via a physical interface.

The logical interface selects an available physical interface and notifies the application module of a network protocol type to be used for communication. In some embodiments, an initial notification from the logical interface may simply indicate that the network connection is UP. In this case, the application module queries the logical interface to receive a further notification indicating the type of network protocol supported by the selected physical interface.

The logical interface may be configured to select a physical interface corresponding to a preferred network protocol when available, based on connection preferences. If a physical interface corresponding to a preferred network protocol is not available, the logical interface selects a physical interface corresponding to a different network protocol, providing a failover process from one network protocol to another network protocol.

In each case, the application module queries the logical interface to determine the network protocol type necessary for communication via a selected physical interface, and proceeds to use that network protocol for communication. For example, if the WCD includes multiple protocol stacks, the application module selects an appropriate network protocol stack based on the notification from the logical interface.

In one embodiment, the disclosure provides a mobile WCD comprising an application module and a logical interface. The application module generates a request for access to a wireless communication network. The logical interface selects a physical interface for access to the wireless communication network in response to the request from the application module. In addition, the logical interface notifies the application module of a network protocol type associated with the selected physical interface. The logical interface may voluntarily provide the notification to the application module upon selection of the physical interface. Alternatively, upon receiving an initial notification that the network is UP, the application module may query the logical interface for notification of network protocol type.

In another embodiment, the disclosure provides a method comprising receiving a request for access to a wireless communication network from an application module within a WCD, invoking a logical interface to select a physical interface for access to the wireless communication network in response to the request from the application module, and notifying the application module of a network protocol type associated with the selected physical interface. The disclosure also contemplates computer-readable media comprising instructions to implement such a method.

The details of one or more embodiments are set forth in the accompanying drawings and the description below. Other features, objects, and advantages will be apparent from the description and drawings, and from the claims.

DETAILED DESCRIPTION

Figure 1:
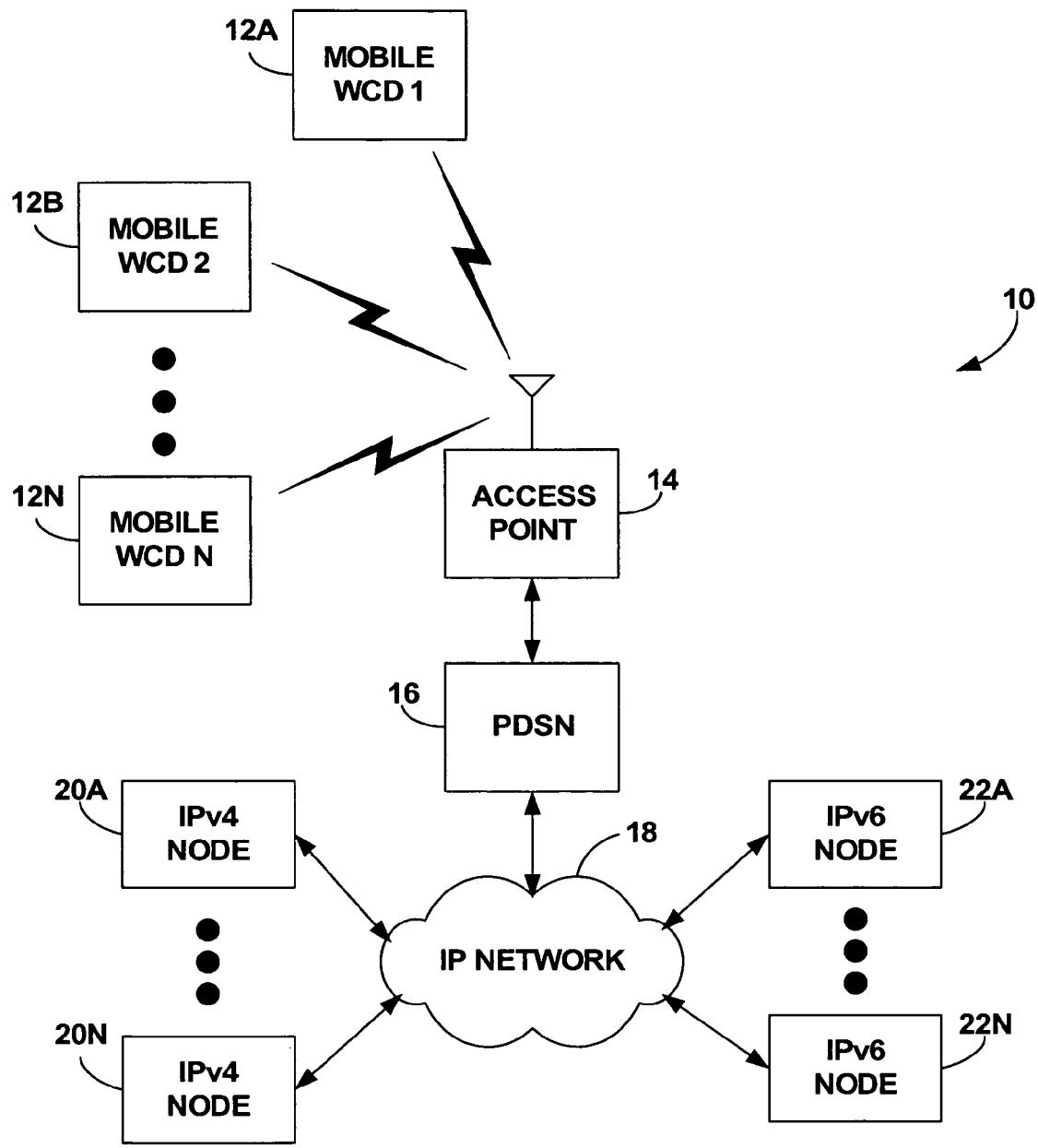
FIG. 1 is a block diagram illustrating a wireless communication network.

FIG. 1 is a block diagram illustrating a wireless communication network 10. As shown in FIG. 1, network 10 includes a plurality of mobile WCDs 12A-12N, collectively WCDs 12. In accordance with this disclosure, one or more WCDs 12 are configured to support failover between different network protocols. The term "failover," as used herein, generally refers to a process for selecting one of a plurality of network protocols for access to communication network 10. Failover may involve selection of a physical interface corresponding to a preferred network protocol, if available, followed by selection of a physical interface corresponding to a different network protocol, when the preferred interface is not available. Although the techniques described herein may be applicable to failover processes for a variety of network protocols, IPv4 and IPv6 will be featured in this disclosure for purposes of illustration.

WCD 12 includes application modules designed to support applications such as email, Internet browsing, text messaging or the like. Some application modules may support only a single network protocol, while other application modules may support two or more network protocols. As an example, some application modules within WCD 12 may support both IPv4 and IPv6 in order to ensure operation across heterogeneous networks that may not support IPv6. At the time an application module requests network access, it is uncertain whether an IPv4 or IPv6 physical interface will be available, i.e., able to connect to network 10 using the pertinent protocol. As a result, the application module cannot immediately bind to the physical interface.

For this reason, WCD 12 is configured to support failover between physical interfaces corresponding to different network protocols, such as IPv4 and IPv6. As one example, if a preferred IPv6 interface is unavailable, WCD 12 implements the failover process to select a less preferred IPv4 interface. Upon completion of the failover process, the application module then communicates using the network protocol associated with the selected physical interface. In this manner, an application module supporting IPv4 and IPv6 is still able to access network 10 even though a preferred physical interface, such as IPv6, may not be able to connect to the network.

To support failover, WCD 12 includes a logical interface that selects a physical interface for access to the network in response to the request from the application module. In this manner, the logical interface handles the network access request from the application module, and negotiates a connection to network 10 via an available physical interface. The application module binds to the logical interface, which provides an abstraction layer between the application module and a potentially changing physical interface.

The logical interface is responsible for selecting an available physical interface, and notifies the application module of a network connection. For example, the logical interface may have a connection state, i.e., UP or DOWN, that is monitored by the application module. The application module may query the logical interface for the network protocol type associated with the selected physical interface when the UP connection state of the logical interface is detected. Alternatively, the logical interface may support the network protocol type directly, so that a query may not need to be forwarded to the physical interface.

In response to a query, the logical interface notifies the application module of the network protocol type associated with the selected physical interface. The application module then uses the appropriate network protocol for communication via the logical interface. Hence, the application module does not select a network protocol until it receives a notification from the logical interface. Upon negotiation of a connection and notification by the logical interface, the application module in WCD 12 selects an appropriate network protocol and communicates with a peer device in network 10 using the selected network protocol. The operation of a logical interface to implement a failover process will be described in greater detail below.

As further shown in FIG. 1, WCDs 12 communicate with a wireless network access point 14 via a selected physical interface. In some embodiments, a CDMA 2000 networking node or a packet data serving node (PDSN) 16 may be coupled between wireless access point 14 and an IP network 18, such as the Internet. In other embodiments, wireless access point 14 and IP network 18 may be connected via a UMTS (Universal Mobile Telecommunication Node) networking node or a GGSN (GPRS Gateway Serving Node) node, or alternatively a Wireless LAN, or an IEEE 802.11 access point. In the example of FIG. 1, multiple IPv4 network nodes 20A-20N (collectively IPv4 nodes 20) and IPv6 network nodes 22A-22N (collectively IPv6 nodes 22) communicate with PDSN 16 via IP network 18. Hence, wireless access point 14 may support wireless communication with WCDs 12 using IPv4 or IPv6. In some areas, however, an IPv6 physical interface may not be available.

WCDs 12 send and receive data via wireless access point 14 and may take the form of cellular radiotelephones, satellite radiotelephones, radiotelephone cards incorporated within portable computers, personal digital assistants (PDAs) equipped with wireless communication capabilities, and the like. In addition, WCDs 12 may include voice communication capabilities, particularly when embodied as a mobile handset. Mobile WCDs 12 may employ a variety of communication techniques, such as code division multiple access (CDMA), wideband CDMA (WCDMA), time division multiple access (TDMA), or frequency division multiple access (FDMA), for communication over a wireless communication channel.

Wireless network access point 14 may take the form of a base station antenna and controller equipped for data communication, voice communication, or both. PDSN 16 serves as a remote device for assignment of IP addresses to mobile WCDs 12. In particular, PDSN 16 is responsible for assigning IP addresses to mobile WCDs 12, and establishing and supporting IP traffic between the mobile WCDs 12 and IP network 18. PDSN 16 may be equipped to act as a foreign agent for mobile WCDs 12, handling care-of addressing and negotiation with home agents (not shown) coupled to IP network 18.

IPv4 nodes 20 are capable of communicating according to the IPv4 network communication protocol, and may take the form of a variety of network resources such as web servers, database servers, web clients, email servers, I/O devices, and the like. Similarly, IPv6 nodes 22 are capable of communicating according to the IPv6 network communication protocol, and may take forms similar to IPv4 nodes 20. IPv6 provides a much larger addressing space than IPv4, however, and may be especially desirable for applications requiring a persistent IP address assignment.

WCDs 12 may be configured as "dual stack" devices that are capable of communication according to both a first network protocol, e.g., IPv6, and a second network protocol, e.g., IPv4. In other words, mobile WCDs 12 implement both an IPv4 protocol stack and an IPv6 protocol stack, each configured for mobile applications. An application module supporting both IPv4 and IPv6 selects one of the network protocol stacks based on the physical interface selected by the logical interface. In particular, the application module binds to the logical interface and uses the appropriate protocol stack in response to a notification from the logical interface.

In general, an application module may be a software process running on a processor within WCD 12. In operation, when a user launches an application, the application module generates a request for access to network 10 to serve the application. An application module could unilaterally select a protocol, IPv4 or IPv6, and bind to a corresponding physical interface. At the time the application module attempts to bind, however, it is uncertain whether a corresponding IPv4 or IPv6 physical interface actually will be available. For this reason, the logical interface is provided to handle the network access request made by the application module, and select an available physical interface on behalf of the application module.

This logical interface serves as an abstraction layer between the IP layer and the physical interface layer. In particular, the logical interface resides between the protocol stack and the physical interface. The physical interface resides directly over a network device layer, such as Ethernet or point-to-point protocol (PPP). The logical interface differs from a physical interface in that the logical interface resides on top of another interface, either physical or logical.

The logical interface, or a controller that configures and associates the logical interface with some underlying interface, associates itself to whichever physical interface (IPv4 and IPv6) is actually available, consistent with any applicable connection preferences. The logical interface subsequently sets its IP address family to that of the underlying physical interface. In this manner, the logical interface can be used to handle fail-over from IPv6 to IPv4, or vice versa, without the need for special configuration of the application module.

As discussed above, when network 10 is available, the logical interface selects an available physical interface and provides an initial notification to the application module that generated the network access request. As will be described, the notification may not be an explicit message, but rather a change in connection state, e.g., UP or DOWN. In response to the notification, the application module queries the logical interface to determine which IP type is associated with the physical interface selected by the logical interface. The logical interface then replies with a notification of the IP type so that the application module knows which IP stack, IPv4 or IPv6, should be selected in order to communicate with other devices in network 10.

As will be described, the logical interface also may implement logic for selection of a preferred physical interface, as well as fail-over to an alternate selection when the first selection is unsuccessful. In this manner, WCD 12 may be configured to favor one type of connection over others. This logic also may include logic for making decisions about interface selection when a connection to an interface with a non-preferred IP type has already been established, or when an application module specifies connection to any available interface, or when a handoff is necessary, as described below.

Figure 2:
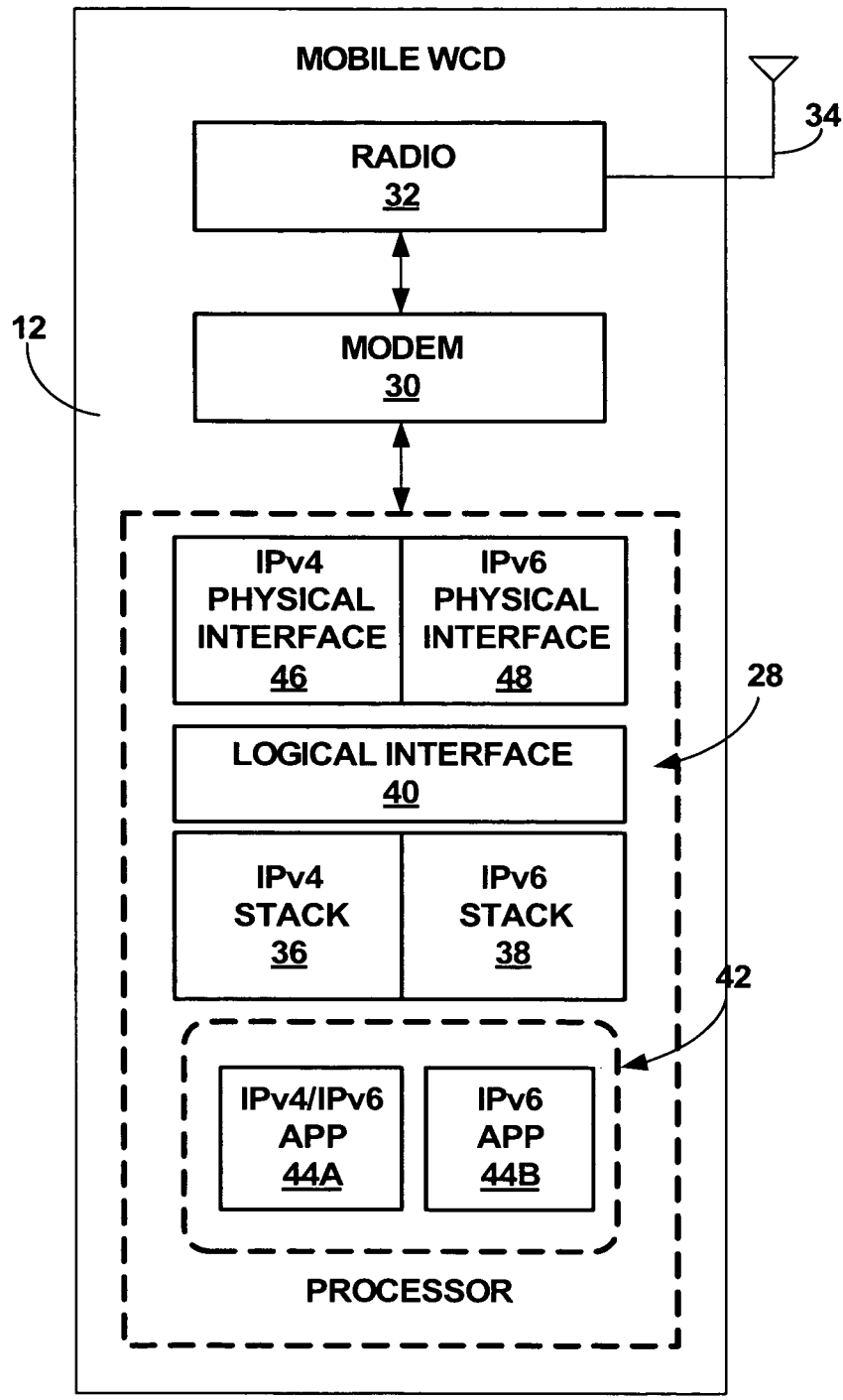
FIG. 2 is a block diagram illustrating a mobile WCD for use within the network of FIG. 1.

FIG. 2 is a block diagram illustrating a mobile WCD 12 for use within the network 10 of FIG. 1. As shown in FIG. 2, mobile WCD 12 includes processor 28, modem 30, radio circuit 32, and antenna 34. Processor 28 executes code stored in a memory (not shown) to implement a dual protocol stack. In particular, processor 28 implements a dual protocol stack, represented by IPv4 stack 36 and IPv6 stack 38, to send and receive IP-based packets according to the IPv4 and IPv6 protocols, respectively. Processor 28 executes one or more applications 42, represented by application module 44A and application module 44B. In addition, processor 28 executes processes to support a logical interface 40 that negotiates a network connection for application modules 44A, 44B. In particular, logical interface 40 negotiates a connection via either IPv4 physical interface 46 or IPv6 physical interface 48.

Modem 30 may be constructed in a conventional manner to modulate and demodulate packets transmitted and received via radio circuitry 32 and antenna 34. For example, modem 30 may implement any of a variety of communication techniques, such as code division multiple access (CDMA), wideband CDMA (WCDMA), time division multiple access (TDMA), or frequency division multiple access (FDMA), for communication over a wireless communication channel. In addition, modem 30 may be configured to operate according to any of a variety of standards, such as CDMA2000 1xRTT, CDMA2000 1xEV-DO, or UMTS. Radio circuitry 32 may include conventional radio frequency (RF) amplifier and filter circuitry for processing of transmitted and received signals.

As mentioned above, applications 42 may support email, Internet service, text messaging, and the like. Some application modules, such as IPv4/IPv6 application module 44A are configured to operate according to either IPv6 or IPv4. Other application modules, such as IPv6 application module 44B, may be configured only for IPv6 operation, or only for IPv4 operation. When a user launches one of the applications, a corresponding application module 44A, 44B generates a network access request.

In response to a network access request from IPv4/IPv6 application module 44A, processor 28 invokes logical interface 40 to negotiate a connection to one of physical interfaces 46, 48 for access to network 10. In this case, IPv4/IPv6 application module 44A binds to logical interface 40. In contrast, when IPv6 application module 44B requests network access, processor 28 binds the IPv6 application module 44B directly to IPv6 physical interface 48, without using logical interface 40. Again, IPv4/IPv6 application module 44A can communicate according to either IPv4 or IPv6, while IPv6 application module 44B is equipped only to communicate according to IPv6. Logical interface 40 and application modules 44 may be implemented as software processes running on a common processor within WCD 12, such as processor 28, or on separate processors or controllers.

When IPv4/IPv6 application module 44A requests network access, the application module binds to the logical interface. However, IPv4/IPv6 application module 44A does not immediately select a particular network protocol. Again, the network protocol type supported by available interfaces may be unknown at the time the network access request is made. Instead, logical interface 40 responds to the network access request from IPv4/IPv6 application module 44A by selecting an available physical interface 46, 48, based on one or more selection rules, and then provides an initial notification to the IPv4/IPv6 application module 44A that network 10 is available. The notification may simply indicate that a physical interface 46 or 48 has been selected, or may further indicate the network protocol, e.g., IPv4 or IPv6, associated with the physical interface.

In typical embodiments, the logical interface 40 will not initially identify the network protocol type. Instead, logical interface 40 will merely indicate a network connection status. If the initial notification does not identify the network protocol type, application module 44A queries logical interface 40 for identification of the network protocol type with which it is associated. In response to this query, logical interface 40 then generates a further notification to application module 44A, identifying the network protocol. Based on the identified network protocol, application module 44A then selects either IPv4 stack 36 or IPv6 stack 38 to use for subsequent communication.

Figure 3:
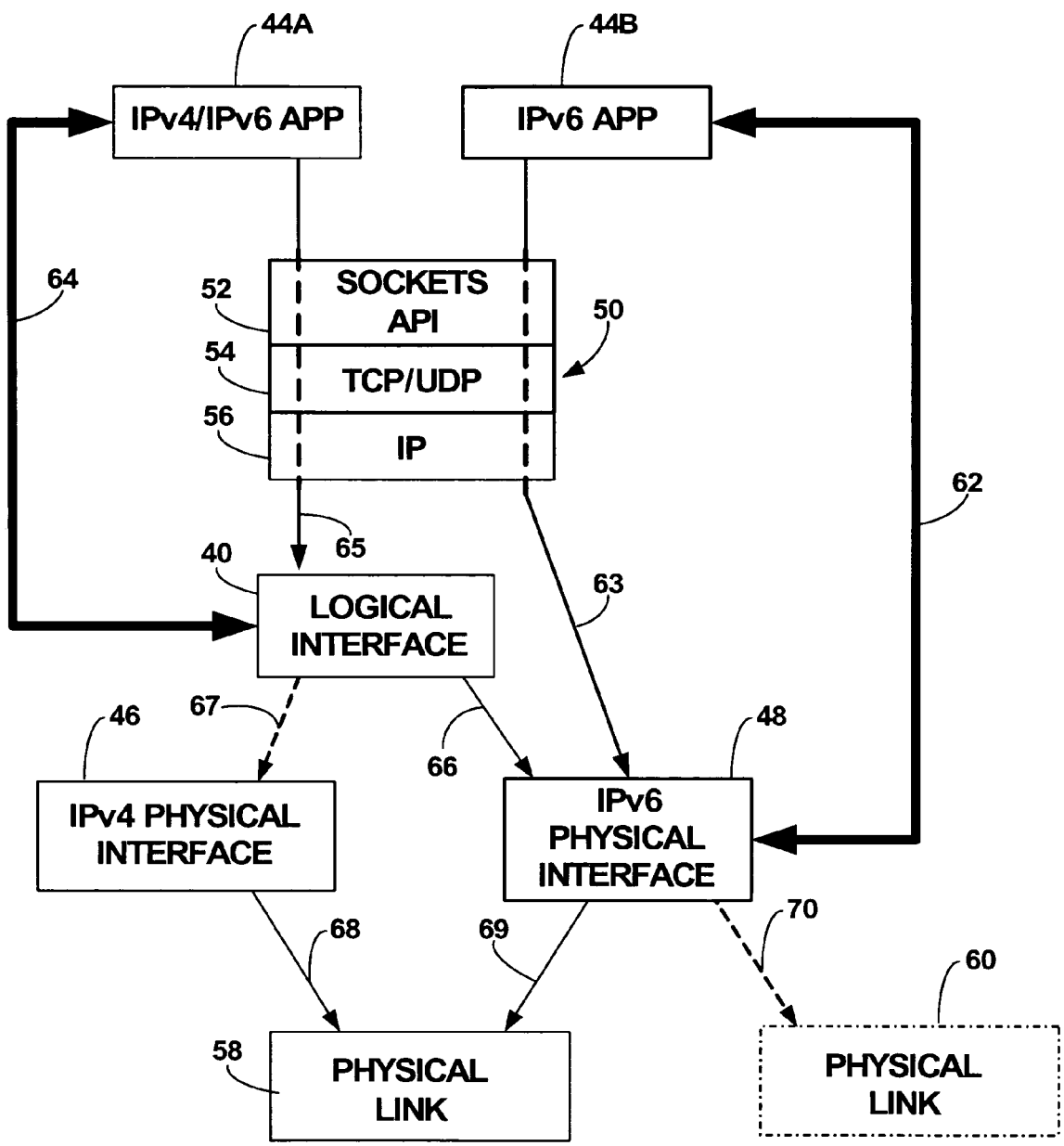
FIG. 3 is a diagram illustrating operation of a protocol stack within a WCD configured to support failover between physical interfaces corresponding to different network protocols.

FIG. 3 is a diagram illustrating operation of a protocol stack 50 configured to support failover between IPv4 and IPv6 physical interfaces in WCD 12, as described herein. As shown in FIG. 3, a WCD 12 may include multiple application modules, although only two applications modules 44A, 44B are shown in FIG. 3 for ease of illustration. Stack 50 further includes dual IP physical interfaces, i.e., IPv4 physical interface 46 and IPv6 physical interface 48, as well as sockets API layer 52, TCP/UDP layer 54, IP layer 56, and logical interface 40.

IPv4 physical interface 46 and IPv6 physical interface 48 are used to selectively access one or more physical links (Phys Link) 58, 60 to network 10 (FIG. 1). Some application modules, such as IPv4/IPv6 application module 44A, are configured for IPv4 or IPv6. Other application modules, such as IPv6 application module 44B, may be configured for IPv6. Logical interface 40 resides on top of IPv4 and IPv6 physical interfaces 46, 48 to handle network access requests from IPv4/IPv6 application module 44A, which supports either IPv4 or IPv6. Separate physical interfaces 46, 48 for IPv4 and IPv6 traffic are needed because the state of IPv4 interface 46 may be different from the state of IPv6 interface 48, and these states may change at any time.

The state of logical interface 40 reflects whether IP traffic can be transmitted by IPv4/IPv6 application module 44. For example, logical interface 40 may have an UP state, indicating a successful connection to a physical interface, and a DOWN state, indicating that a physical interface is unavailable. In addition, logical interface 40 may have transitory states such as COMING_UP, to indicate that the logical interface is establishing a connection to a physical interface, and GOING_DOWN, to indicate that logical interface 40 is tearing down a connection.

When a corresponding application is launched, IPv6 application module 44B, which supports only IPv6, specifies the IPv6 protocol when requesting access to network 10. In this case, IPv6 application module 44B immediately binds directly to the IPv6 physical interface 48, as indicated by line 62. In particular, IPv6 application module 44B employs sockets API layer 52, TCP/UDP layer 54, and IP layer 56, but does not bind to logical interface 40. Instead, data flows from IPv6 application module 44B, through sockets API layer 52, TCP/UDP layer 54, and IP layer 56, and to IPv6 physical interface 48, as indicated by line 63. If IPv6 services are not available from network 10, IPv6 physical interface 48 is not available, and the network access request made by IPv6 application module 44B fails. Network access failure may be indicated by a DOWN status returned by IPv6 physical interface 48.

In contrast to application module 44B, IPv4/IPv6 application module 44A, which supports either IPv4 or IPv6, does not specify a particular IP type when requesting access to a network interface. Instead, IPv4/IPv6 application module 44A binds to logical interface 40 within stack 50, as indicated by line 64. Logical interface 40 then negotiates to bring up an available physical interface. Logical interface 40 notifies the requesting application module 44A when a successful connection is made, either to IPv4 physical interface 46 or IPv6 physical interface 48. IPv4/IPv6 application module 44A queries logical interface 40 for the pertinent IP type, and then communicates via sockets API layer 52, TCP/UDP layer 54, and IP layer 56, as indicated by line 65, using the appropriate IP type. Hence, logical interface 40 permits the use of an IPv4/IPv6 application module 44A that is designed to support either IPv4 or IPv6.

Logical interface 40 notifies IPv4/IPv6 application module 44A upon successful connection to a physical interface. In a typical embodiment, however, the notification is not an explicit message. Instead, IPv4/IPv6 application module 44A monitors the state of logical interface 40. When the state transitions to the UP state, IPv4/IPv6 application module 44A determines that a connection is available. In this case, IPv4/IPv6 application module 44A then queries logical interface 40 for the appropriate network protocol type. Logical interface 40 may query the selected physical interface for the network protocol type. Alternatively, logical interface 40 may already be associated with the pertinent network protocol type, in which case it is unnecessary to query the physical interface. Logical interface 40 notifies IPv4/IPv6 application module 44A of the network protocol type in response to the query. In response, IPv4/IPv6 application module 44A then communicates via the appropriate protocol stack.

Logical interface 40 may be configured to operate according to one or more connection rules. In the example of FIG. 3, logical interface 40 preferentially attempts to connect via IPv6 physical interface 48, as indicated by solid line 66. If a connection via IPv6 physical interface 48 is not possible, logical interface fails over to IPv4 physical interface 46, as indicated by dashed line 67. According to the connection rules, a particular physical link 58, 60 also may be preferred. In the example of FIG. 3, physical link 58 is preferred for IPv4 physical interface 46 and IPv6 physical interface 48, as indicated by solid lines 68, 69. If IPv6 service is not available via physical link 58, however, IPv6 physical interface 60 permits failover to a different physical link, i.e., physical link 60, as indicated by dashed line 70. If neither physical link 58, 60 supports IPv6 protocol, IPv6 physical interface 48 returns a DOWN status to IPv4/IPv6 application module 44A via logical interface 40, or directly to IPv6 application module 44B.

In the above manner, logical interface 40 provides an abstraction layer between IPv4/IPv6 application module 44A and physical interfaces 46, 48. Thus, it is not immediately necessary to determine which protocol type, IPv4 or IPv6, is supported in order to bind IPv4/IPv6 application module 44A to one of physical interfaces 46, 48. Rather, IPv4/IPv6 application module 44A is bound to logical interface 40. Logical interface 40, or a controller that configures and associates logical interface 40 with some underlying interface, binds to either IPv4 interface 46 or IPv6 interface 48, depending on which one comes up. Logical interface 40 then sets its address family to that of the underlying IP interface. This method can address fail-over from IPv6 to IPv4 or the reverse.

Figure 4:
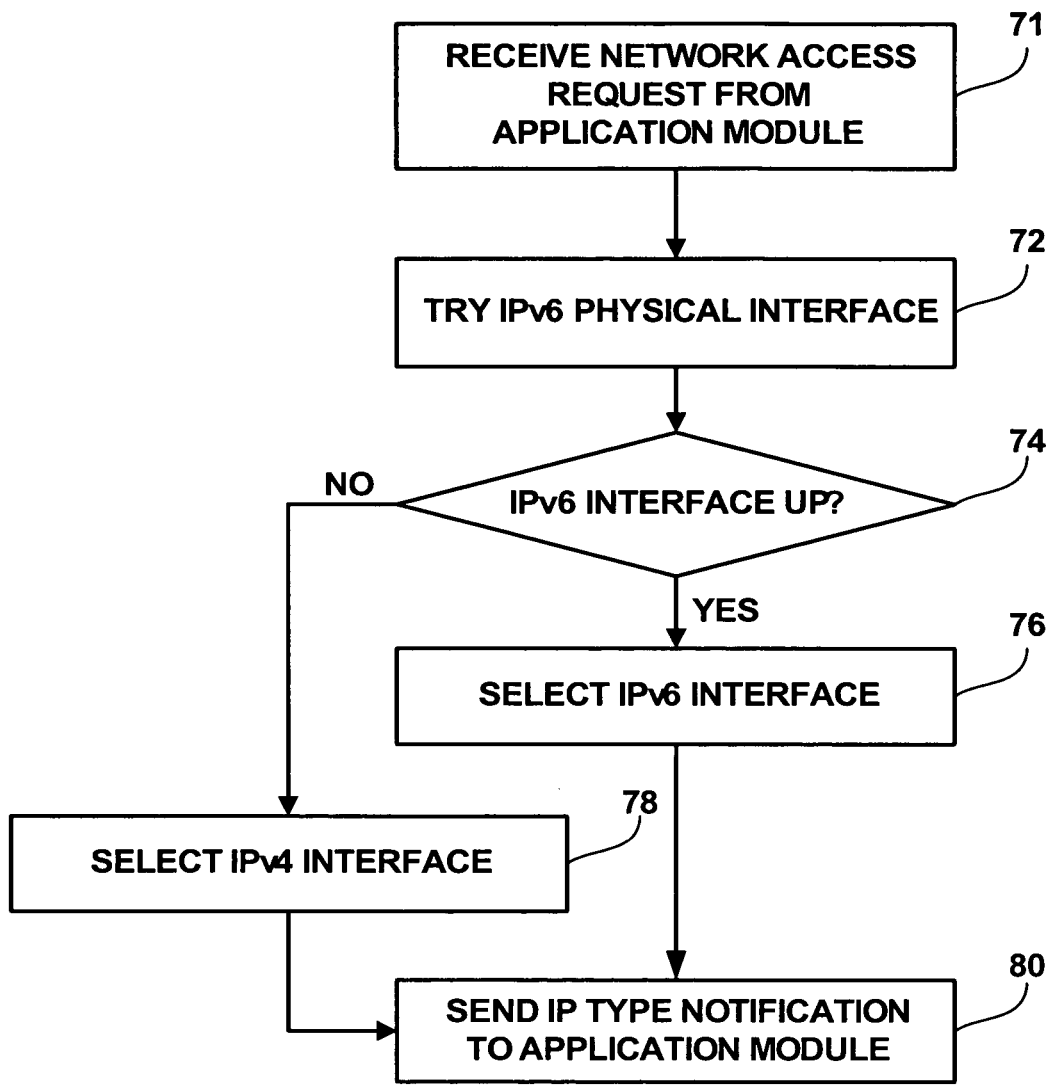
FIG. 4 is a flow diagram illustrating operation of a logical interface within a WCD in selecting a physical interface for network access.

FIG. 4 is a flow diagram illustrating operation of logical interface 40 within WCD 12 in selecting a physical interface for network access by IPv4/IPv6 application module 44A. In the example of FIG. 4, it is assumed that IPv6 physical interface 48 is a preferred interface for connection to network 10. However, IPv6 physical interface 48 may not be able to connect to a physical link that supports IPv6 within some areas of network 10. As shown in FIG. 4, logical interface 40 receives a network access request from IPv4/IPv6 application module 44A (71). As discussed above, the network access request from IPv4/IPv6 application module 44A does not specify an IP version, because it is not known whether an IPv6 physical interface 48 will be UP.

In response to the network access request, logical interface 40 initially tries to connect to network 10 via IPv6 physical interface 48 (72). If the status of IPv6 physical interface 48 is UP (74), i.e., the IPv6 physical interface is able to connect to a physical link that supports IPv6, logical interface 40 selects the IPv6 interface (76) and returns an UP status to IPv4/IPv6 application module 44A. If the status of IPv6 physical interface 48 is DOWN (74), logical interface 40 instead selects the IPv4 interface 46, and returns an UP status for that interface. In other words, if IPv6 interface 48 is not available, logical interface 40 attempts to bring up network 10 via IPv4 interface 46 (78). Of course, in some circumstances, both IPv4 interface 46 and IPv6 interface 48 may be DOWN, resulting in network access failure.

Upon receiving a notification of physical interface selection, i.e., in the form of an UP status from logical interface 40, IPv4/IPv6 application module 44A queries the logical interface for the network protocol type associated with the selected physical interface 46 or 48. In response to the query, logical interface 40 sends a notification of the IP type to IPv4/IPv6 application module 44A (80).

Figure 5:
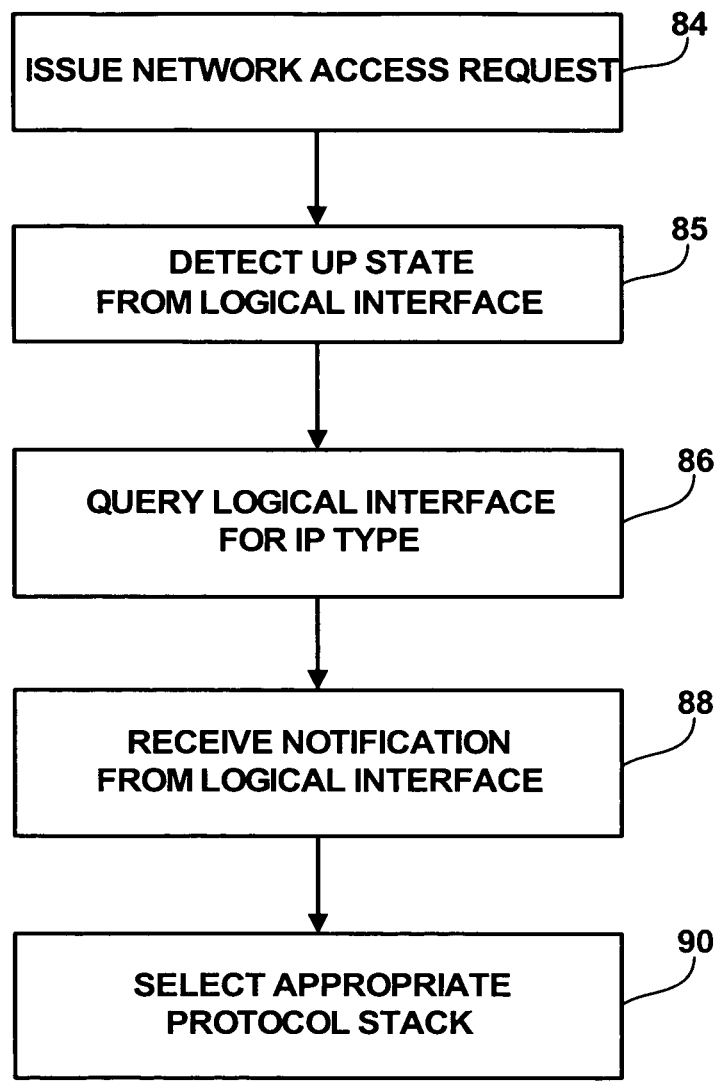
FIG. 5 is a flow diagram illustrating operation of an application module within a WCD in accessing a network using different network protocols.

FIG. 5 is a flow diagram illustrating operation of IPv4/IPv6 application module 44A in attempting to access network 10. As shown in FIG. 5, when a user launches a corresponding application, IPv4/IPv6 application module 44A issues a network access request (84). The network access request does not specify a network protocol type, and so is handled by logical interface 40. Upon detection of an UP state from logical interface 40 (85), IPv4/IPv6 application module 44A queries logical interface 40 for the network protocol type associated with the physical interface selected by the logical interface (86). Once the logical interface 40 provides a notification of the network protocol type (88), IPv4/IPv6 application module 44A selects the appropriate protocol stack (90).

Figure 6:
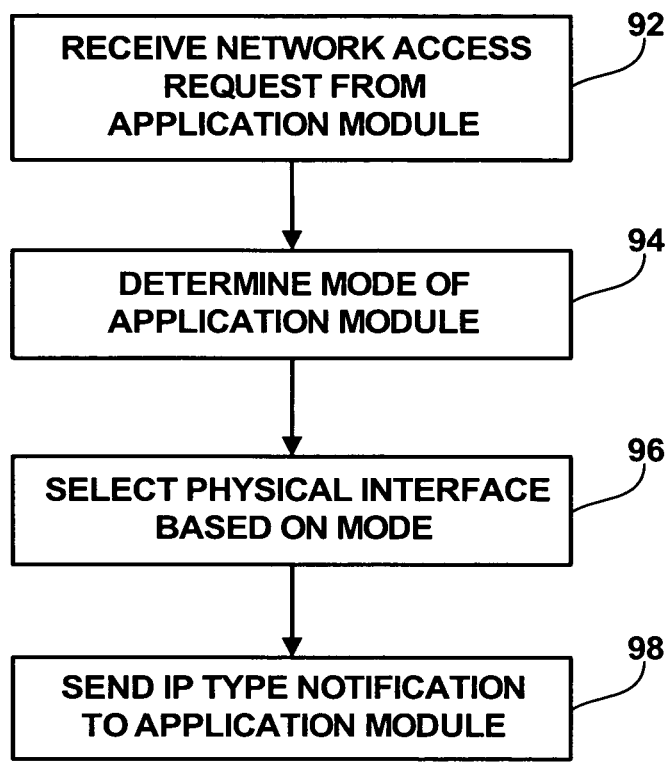
FIG. 6 is a flow diagram illustrating operation of a logical interface according to connection preferences specified by an application module.

FIG. 6 is a flow diagram illustrating operation of logical interface 40 of a WCD 12 in selecting a physical interface according to connection preferences specified either by a global setting or specifically by IPv4/IPv6 application module 44A. In a mobile environment, the process shown in FIG. 6 may be applicable to initial call setup, handoff situations, or both. In the case of an initial call setup, the process begins when IPv4/IPv6 application module 44A issues a network access request (92). In the example of FIG. 6, however, IPv4/IPv6 application module 44A also indicates a connection mode.

In particular, IPv4/IPv6 application module 44A may operate in a "desired" mode or a "preferred" mode. The desired mode requires that the logical interface always attempt to use a preferred physical interface, which ordinarily will be an IPv6 physical interface. The desired mode applies in both call set-up and handoff situations. The preferred mode requires that the device attempt to establish the preferred physical interface only if a non-preferred interface is not already UP. If the preferred interface is already established, it will always be selected regardless of the preferred/desired setting. Accordingly, if a non-preferred interface is already UP, logical interface 40 will attempt to establish the preferred interface in desired mode, but use the non-preferred interface if it is already established in preferred mode.

Hence, in the example of FIG. 6, to select a physical interface, logical interface 40 first checks the preferred/desired mode setting to determine if it is in the desired mode or preferred mode (94). Logical interface 40 then selects a physical interface based on the requirements of the applicable mode (96). If the desired mode is selected, logical interface 40 attempts to establish the IPv6 physical interface without regard to whether an IPv4 interface is already UP. If the preferred mode is selected, however, logical interface 40 attempts to establish the IPv6 physical interface only if an IPv4 interface is not already UP. Accordingly, if the IPv4 interface is already UP, in the preferred mode, IPv4/IPv6 application module 44A simply uses that interface, rather than establishing the IPv6 interface.

Once the state of logical interface 40 is UP, IPv4/IPv6 application module 44A queries for the IP type. In response, logical interface 40 sends an IP type notification to IPv4/IPv6 application module 44A (98). The logical interface remains bound to the selected physical interface until the application is terminated, the physical interface goes DOWN, or a transition to a different interface is necessitated by a handoff as mobile WCD 12 travels across network 10.

Figure 7A:
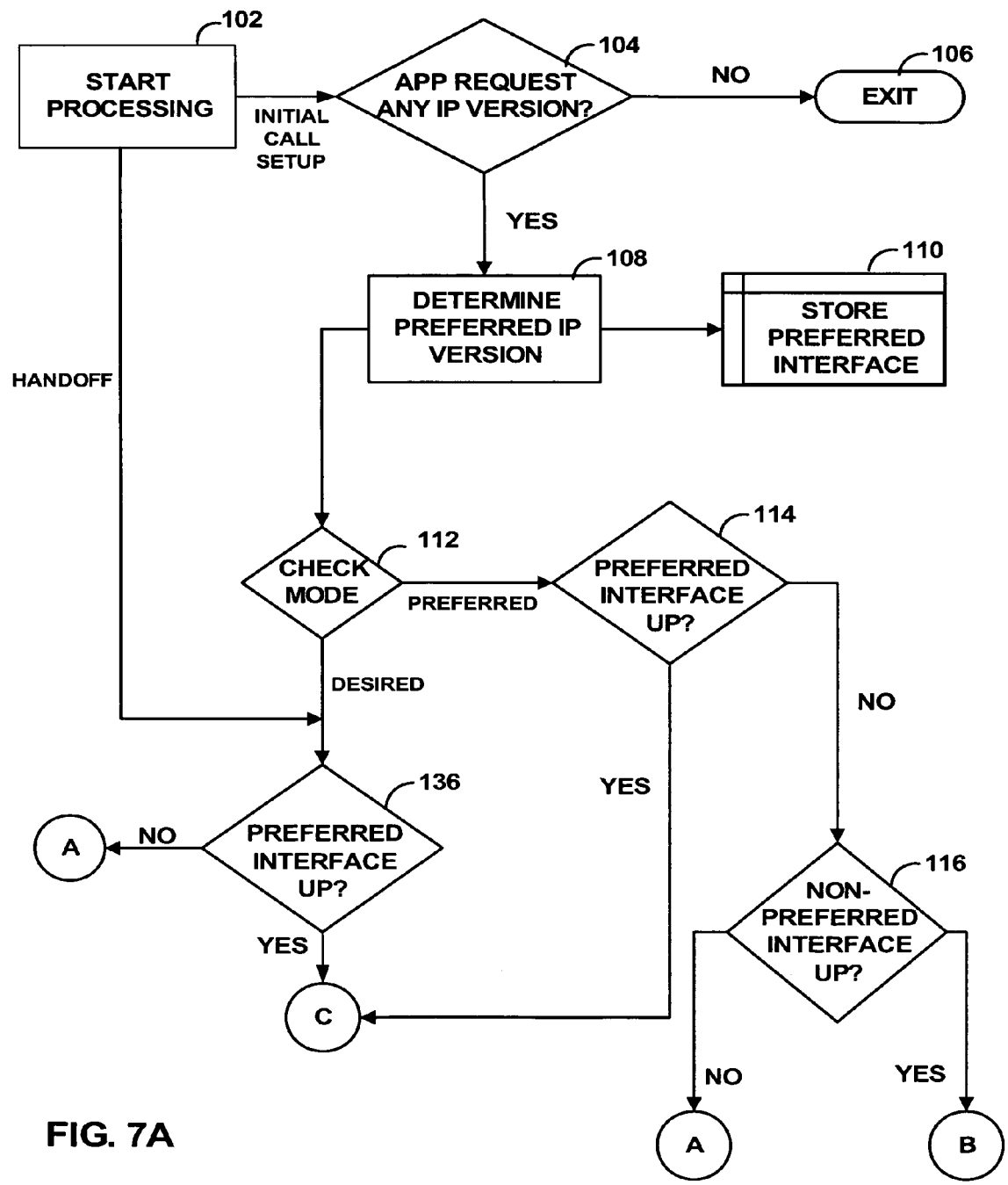
FIGS. 7A and 7B are flow diagrams further illustrating operation of a logical interface in different connection modes.
Figure 7B:
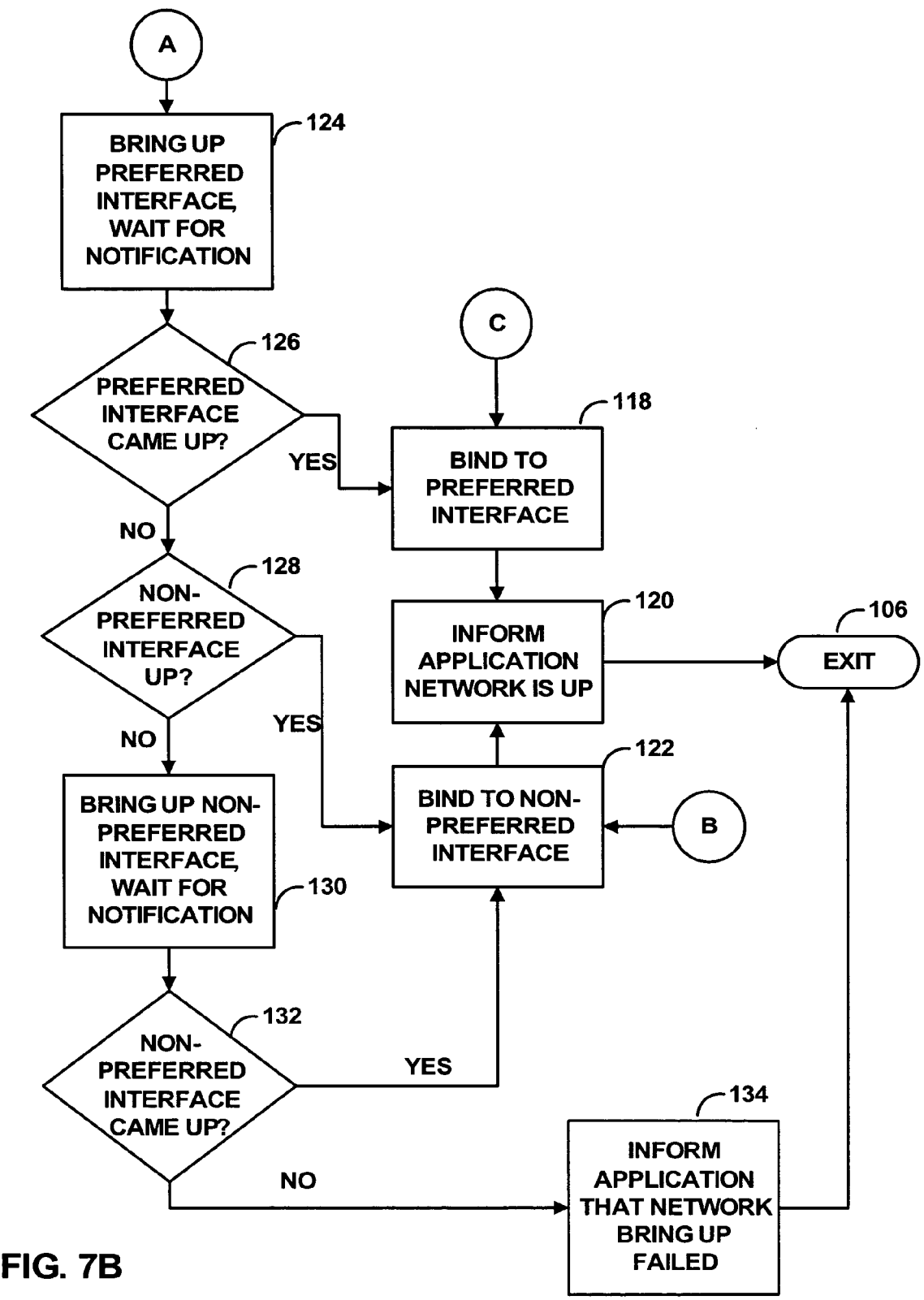

FIGS. 7A and 7B are flow diagrams further illustrating operation of a logical interface 40 in different connection modes specified by IPv4/IPv6 application module 44A. FIGS. 7A and 7B depict instances of both initial call setup and handoff processing. As shown in FIG. 7A, upon the start of processing (102) for initial call setup, it is necessary to determine whether an application module requesting networking access is an IPv4/IPv6 application module or an IPv6-only application module (104). Also, in some embodiments, IPv4-only application modules may request network access. If the application module is requesting only IPv6 access, there is no need to bind to logical interface 40, and the process exits (106). If the application module requests "any" IP version, i.e., IPv4 or IPv6, however, logical interface 40 determines the preferred IP version for the P interface (108) and stores the preferred IP version (110). For example, IPv4/IPv6 application module 44A ordinarily will specify IPv6 as the preferred type of physical interface.

Then, logical interface 40 determines the preferred/desired mode to determine whether the application module is in a "desired" mode or "preferred" mode (112), as discussed above. If the IPv4/IPv6 application module 44A is operating in a preferred mode, logical interface 40 will determine if the preferred interface, e.g., an IPv6 interface, is UP (114). If not, logical interface 40 determines whether a non-preferred interface, e.g., IPv4, is UP (116). As shown in FIG. 7B, if a preferred interface is UP, then logical interface 40 binds to the preferred interface (118), informs the IPv4/IPv6 application module that the network is UP (120), and exits (106). If the preferred interface is not UP, but the non-preferred interface is UP (116), the process binds the IPv4/IPv6 application module to the non-preferred interface (122), informs the IPv4/IPv6 application module 44A (120), and exits (106).

If the preferred interface is not UP (114) and a non-preferred interface is not UP (116), then the logical interface 40 attempts to bring up the preferred interface and waits for notification (124). If the preferred interface comes UP (126), then the process binds IPv4/IPv6 application module 44A to the preferred interface (88) and informs the requesting application that the network is UP (120). If the preferred interface did not come UP (126), e.g., within a prescribed time period, then the process again determines whether a non-preferred interface is UP (128). If so, the process binds IPv4/IPv6 application module 44A to the non-preferred interface (122), and informs the requesting application that the network is UP (120).

If the non-preferred interface is not UP (128), the process attempts to bring up the non-preferred interface and waits for notification (130). If the non-preferred interface comes UP (132), the process binds IPv4/IPv6 application module 44A to the non-preferred interface (122), and informs the requesting application that the network is UP (120). If the non-preferred interface does not come UP, the process informs the application that the attempt to bring up the network failed (134), and exits (106).

When a handoff occurs, or when IPv4/IPv6 application module 44A is in desired mode (112), the process operates in desired mode and determines whether the preferred interface is UP (136). If not, the process branches to operation 124. If the preferred interface is UP, however, the process binds the logical interface to the preferred interface (118), and informs the application that the network is UP (122). Hence, in the desired mode, the process will not change between interfaces if the preferred interface is already up, but will attempt to bring up the preferred interface if it is not UP. In contrast, in the preferred mode, the process may use a non-preferred interface, if available, rather than attempting to bring up the preferred interface if it is found to be DOWN.

In this manner, if the attempt to bring up network 10 fails to establish the preferred IP version, the existing application will not see any changes. However, if the attempt does succeed, the logical interface 40 binds IPv4/IPv6 application module 44A to the preferred interface (e.g., IPv6), and established applications are notified that the IP version has changed. This method can address fail-over from IPv6 to IPv4 or the reverse. Alternatively, in other embodiments, the preferred mode may be configured to make an attempt to bring up the preferred interface. Accordingly, the design of the preferred mode may be subject to variation, as desired.

As indicated by FIGS. 7A and 7B, in the desired mode, an application module 44A may be forced to re-establish its session with a peer upon handoff. In particular, logical interface 40 may be configured to always attempt a connection to an IPv6 interface upon handoff, even if application module 44A was previously using IPv4 for an existing session. Also, in the desired mode, an application module that attempts to access network 10 for a new session likewise will require that logical interface 40 attempt to connect via an IPv6 physical interface, even if an IPv4 interface is already available.

If the attempt to access network 10 via the IPv6 interface fails, the existing application will not see any changes. In other words, the existing application will continue to use the IPv4 protocol. However, if the attempt does succeed for the new application, logical interface 40 will re-associate itself with the preferred IPv6 interface, causing the established applications to be notified that the necessary protocol has changed. In this case, the new application actually causes a change in the protocol for existing applications.

The techniques described herein may be implemented in hardware, software, firmware, or any combination thereof. If implemented in hardware, the techniques may be realized by one or more microprocessors, digital signal processors (DSPs), application specific integrated circuits (ASICs), field programmable gate arrays (FPGAs), or other equivalent programmable or fixed logic circuitry. If implemented in software, the techniques may be directed to a computer readable medium comprising program code, that when executed, performs one or more of the techniques described herein.

Although the techniques described herein have focused on access to IPv4 and IPv6 interfaces, similar principles may be applied for access among a variety of different network protocols and addressing families. Accordingly, the disclosure is not limited to IPv4, IPv6, or to IP in general. Also, the techniques are not limited to wireless communication, and may find application in wired networks.

Various embodiments have been described. These and other embodiments are within the scope of the following claims.

The invention claimed is:

1. A wireless communication device, comprising:
at least one processor executing an application module and a logical interface;
the application module generating a request for access to a wireless communication network to the logical interface in response to supporting communication for a corresponding application on the wireless communication device,
wherein the application module supports a plurality of different types of network protocols,
wherein the request for access is sent by the application module prior to a selection by the application module of one of a plurality of different protocol stacks to utilize for communication during the access to the wireless communication network;
the logical interface in communication with a plurality of different physical interfaces;
wherein the application module binds to the logical interface prior to the selection by the application module of one of the plurality of different protocol stacks to utilize for communication during the access to the wireless communication network;
wherein the logical interface selects a physical interface for connecting to the wireless communication network from the plurality of different physical interfaces for access to the wireless communication network in response to the request from the application module and notifies the application module of a network protocol type associated with the selected physical interface;
wherein the application module further selects one of the plurality of different protocol stacks on the wireless communication device capable of communicating according to the network protocol type associated with the selected physical interface; and
wherein the application module communicates via the selected protocol stack during the access to the wireless communication network via the connection provided by the selected physical interface.

2. The device of claim 1, wherein the logical interface notifies the application module of the network protocol type associated with the selected physical interface in response to a query from the application module.

3. The device of claim 1, wherein the logical interface establishes a connection to the selected physical interface.

4. The device of claim 1, wherein the plurality of different protocol stacks comprise an Internet Protocol version 6 (IPv6) stack and an Internet Protocol version 4(IPv4) stack.

5. The device of claim 1, wherein the network protocol type associated with the selected physical interface is one of IPv4 or IPv6.

6. The device of claim 1, wherein the request for network access does not indicate a network protocol type.

7. The device of claim 1, wherein the logical interface selects the physical interface according to respective selection rules corresponding to a mode of the application module,
wherein the mode of the application module is one of a preferred mode and a desired mode,
the desired mode specifying selection of a particular physical interface having a particular network protocol type, and the preferred mode specifying selection of any physical interface having a connection to the wireless communication network or, if no physical interface has a connection to the wireless communication network, attempting to establish a connection using the particular physical interface having the particular network protocol type.

8. The device of claim 1, wherein the application module generates the request for network access during an initial call setup or during a handoff.

9. A method, comprising:
sending a request for access to a wireless communication network from an application module to a logical interface within a wireless communication device in response to supporting communication for a corresponding application on the wireless communication device,
wherein the application module supports a plurality of different types of network protocols,
wherein the request for access is sent by the application module prior to a selection by the application module of one of a plurality of different protocol stacks to utilize for communication during the access to the wireless communication network;
binding, by the application module, to the logical interface prior to the selection by the application module of one of the plurality of different protocol stacks to utilize for communication during the access to the wireless communication network;
selecting, by the logical interface, a physical interface for connecting to the wireless communication network from a plurality of different physical interfaces for access to the wireless communication network in response to the request from the application module;
notifying the application module of a network protocol type associated with the selected physical interface;
selecting, by the application module, one of the plurality of different protocol stacks on the wireless communication device capable of communicating according to the network protocol type associated with the selected physical interface; and
communicating, by the application module via the selected protocol stack, during the access to the wireless communication network via the connection provided by the selected physical interface.

10. The method of claim 9, wherein notifying the application module of the network protocol type includes notifying in response to a query from the application module.

11. The method of claim 9, further comprising establishing, by the logical interface, a connection to the selected physical interface.

12. The method of claim 9, wherein selecting, by the application module, one of the plurality of different protocol stacks comprises selecting an Internet Protocol version 6 (IPv6) stack or an Internet Protocol version 4 (IPv4) stack.

13. The method of claim 9, wherein the network protocol type associated with the selected physical interface is one of IPv4 or IPv6.

14. The method of claim 9, wherein the request for network access does not indicate a network protocol type.

15. The method of claim 9, wherein selecting the physical interface further comprises selecting according to respective selection rules corresponding to a mode of the application module,
wherein the mode of the application module is one of a preferred mode and a desired mode,
the desired mode specifying selection of a particular physical interface having a particular network protocol type, and
the preferred mode specifying selection of any physical interface having a connection to the wireless communication network or, if no physical interface has a connection to the wireless communication network, attempting to establish a connection using the particular physical interface having the particular network protocol type.

16. The method of claim 9, wherein sending the request for network access occurs during an initial call setup or during a handoff.

17. A non-transitory computer-readable medium comprising instructions to cause a processor to:
send a request for access to a wireless communication network from an application module to a logical interface within a wireless communication device in response to supporting communication for a corresponding application on the wireless communication device,
wherein the application module supports a plurality of different types of network protocols,
wherein the request for access is sent by the application module prior to a selection by the application module of one of a plurality of different protocol stacks to utilize for communication during the access to the wireless communication network;
bind, by the application module, to the logical interface prior to the selection by the application module of one of the plurality of different protocol stacks to utilize for communication during the access to the wireless communication network;
select, by the logical interface, a physical interface for connecting to the wireless communication network from a plurality of different physical interfaces for access to the wireless communication network in response to the request from the application module;
notify the application module of a network protocol type associated with the selected physical interface;
select, by the application module, one of the plurality of different protocol stacks on the wireless communication device capable of communicating according to the network protocol type associated with the selected physical interface; and
communicate, by the application module via the selected protocol stack, during the access to the wireless communication network via the connection provided by the selected physical interface.

18. The non-transitory computer-readable medium of claim 17, wherein the instructions cause the processor to notify the application module of the network protocol type in response to a query from the application module.

19. The non-transitory computer-readable medium of claim 17, wherein the instructions cause the processor to establish a connection between the logical interface and the selected physical interface.

20. The non-transitory computer-readable medium of claim 17, wherein the plurality of different protocol stacks comprise an Internet Protocol version 6 (IPv6) stack and an Internet Protocol version 4 (IPv4) stack.

21. The non-transitory computer-readable medium of claim 17, wherein the network protocol type associated with the selected physical interface is one of IPv4 or IPv6.

22. The non-transitory computer-readable medium of claim 17, wherein the request for network access does not indicate a network protocol type.

23. The non-transitory computer-readable medium of claim 17, wherein the instructions that cause the processor to select the physical interface further comprise instructions to select according to respective selection rules corresponding to a mode of the application module,
- wherein the mode of the application module is one of a preferred mode and a desired mode,
- the desired mode specifying selection of a particular physical interface having a particular network protocol type, and
- the preferred mode specifying selection of any physical interface having a connection to the wireless communication network or, if no physical interface has a connection to the wireless communication network, attempting to establish a connection using the particular physical interface having the particular network protocol type.

24. An apparatus, comprising:
- means for supporting application communication with a wireless communication network for a corresponding application on a wireless communication device;
- means for communicating with a plurality of different physical interfaces;
- wherein the means for supporting application communication comprises a means for sending a request for access to the wireless communication network to the means for communicating with the plurality of different physical interfaces in response to supporting communication for the corresponding application,
- wherein the means for supporting application communication supports a plurality of different types of network protocols,
- wherein the request for access is sent prior to a selection by the means for supporting application communication of one of a plurality of different protocol stacks to utilize for communication during the access to the wireless communication network;
- means for binding the means for supporting application communication to the means for communicating with the plurality of different physical interfaces prior to the selection of one of the plurality of different protocol stacks to utilize for communication during the access to the wireless communication network;
- means for selecting a physical interface for connecting to the wireless communication network from the plurality of different physical interfaces for access to the wireless communication network in response to the request from the means for supporting application communication:
- means for notifying the means for supporting application communication of a network protocol type associated with the selected physical interface;
- means for selecting one of the plurality of different protocol stacks on the wireless communication device capable of communicating according to the network protocol type associated with the selected physical interface; and
- wherein the means for supporting application communication communicates via the selected protocol stack during the access to the wireless communication network via the connection provided by the selected physical interface.

25. The apparatus of claim 24, wherein the means for selecting the physical interface further comprises respective selection rules corresponding to a mode of the application module,
- wherein the mode of the application module is one of a preferred mode and a desired mode,
- the desired mode specifying selection of a particular physical interface having a particular network protocol type, and
- the preferred mode specifying selection of any physical interface having a connection to the wireless communication network or, if no physical interface has a connection to the wireless communication network, attempting to establish a connection using the particular physical interface having the particular network protocol type.

* * * * *